G. H. F. HOLY.
SYSTEM OF CONTROL.
APPLICATION FILED DEC. 2, 1920.

1,430,549.

Patented Oct. 3, 1922.

WITNESSES:
H. T. Shelhamer
H. L. Keith

INVENTOR
George H. F. Holy
BY
Wesley J. Carr
ATTORNEY

Patented Oct. 3, 1922.

1,430,549

UNITED STATES PATENT OFFICE.

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed December 2, 1920. Serial No. 427,757.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Systems of Control, of which the following is a specification.

My invention relates to motor-control systems and it has particular relation to such systems as are employed in connection with railway cars.

The object of my invention is to provide a simple and efficient means for obtaining a greater range of speed control than may be secured by the usual regulation of the value of current traversing the motor field winding.

In the present system, it is proposed to provide a series motor with a number of turns on the field-magnet winding in excess of the number required for normal operation. When so connected that the entire winding is energized, the motor operates at a minimum speed. To obtain a higher speed, a resistor is connected in shunt with the field when all of the field turns are effective. A further accelerating step is provided by simultaneously reducing the number of effective turns and disconnecting the resistor from the circuit. After the motor attains the speed determined by the last-named condition, the said resistor is connected in shunt with the effective turns to produce the final speed change.

My invention will be described in connection with the accompanying drawings in which—

Figure 1:
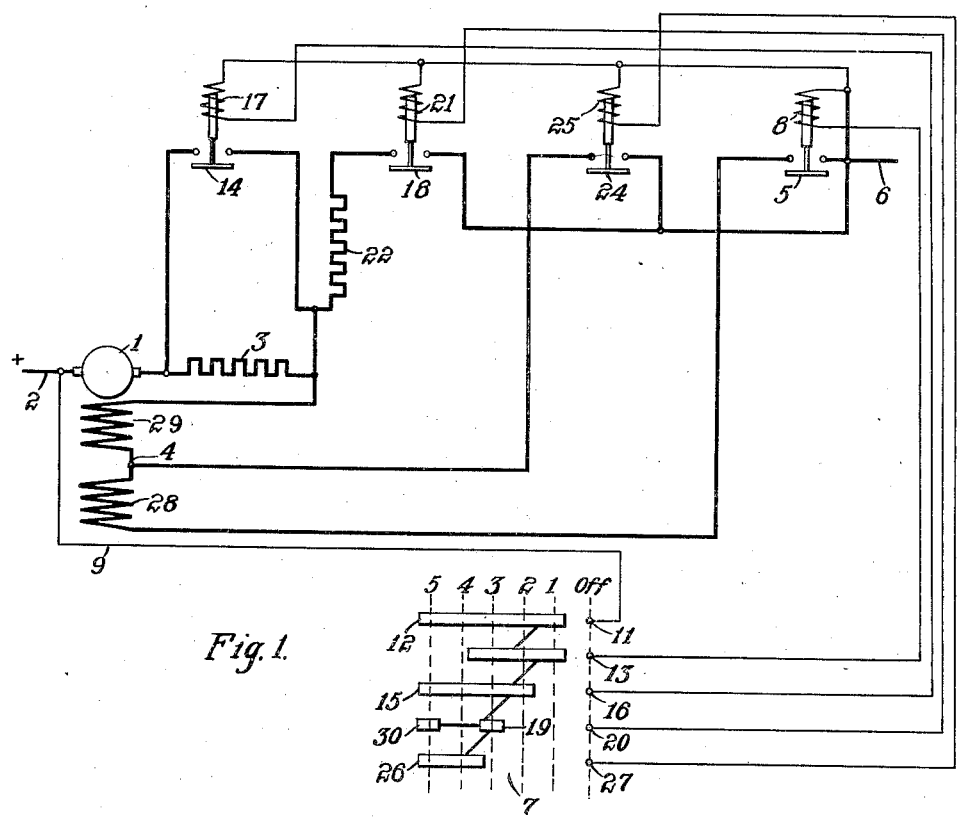
Fig. 1 is a diagrammatic view of the circuits and apparatus embodying my invention.
Figures 2, 3:
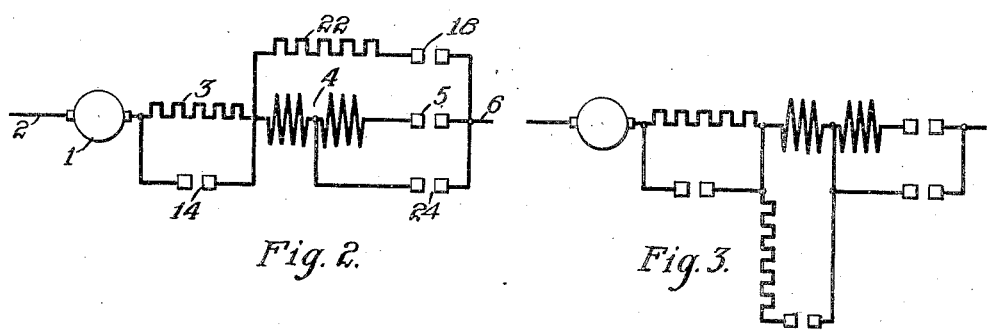
Fig. 2 is a diagrammatic view of the main circuits of the system of Fig. 1.
Fig. 3 is a modification of the system shown in Fig. 2.

Referring to Fig. 1, the motor armature 1 is connected to the positive conductor 2. An accelerating resistor 3 and a series field magnet winding 4 are connected in circuit with the armature to complete a circuit through contactor 5 to the negative conductor 6. The actuation of the master switch 7 to its first position establishes a circuit for the coil 8 of line contactor 5 which extends from positive conductor 2, through conductor 9, contact finger 11, contact segment 12, contact finger 13 and coil 8, to negative line conductor 6.

The master switch, in its second operating position, establishes a circuit for the actuating coil of contactor 14, which, upon closure, shunts resistor 3 to accelerate the motor in the usual manner. The closing circuit for contactor 14 is established from positive conductor 9, through contact finger 11, contact segment 12, contact segment 15, contact finger 16 and actuating coil 17, to negative line conductor 6.

The main circuit for the motor is now established from positive line conductor 2, through armature 1, contactor 14, field-magnet winding 4 and contactor 5, to negative line conductor 6. The connections now establish the lowest operating speed with maximum field excitation of the motor.

In the third position of the master switch, a circuit is established for the closing coil of contactor 18, which circuit is traced from positive line conductor 9, through contact finger 11, contact segment 12, contact segment 19, contact finger 20 and actuating coil 21, to negative line conductor 6. The closure of contactor 18 establishes a circuit for resistor 22, which is then in shunt relation to the field-magnet winding 4. The current traversing the armature 1 from the positive line conductor 2 and passing through contactor 14 divides, one path extending through the series field winding 4 and contactor 5, the other path extending from contactor 14 through resistor 22 and contactor 18, to the negative line conductor 6. The motor now operates at a second and higher speed by reason of the diminished field excitation.

When the master switch is actuated to its fourth position, it disengages contact segment 19 from contact finger 20, thereby de-energizing coil 21 of contactor 18. The opening of contactor 18 opens the circuit of resistor 22. In the same position of the master switch, a circuit is established for the actuating coil 25 of contactor 24, which extends from positive line conductor 9, through contact finger 11, contact segment 12, contact segment 26, contact finger 27 and coil 25, to negative line conductor 6. The closure of contactor 24 shunts a portion 28 of series field winding 4 and establishes a circuit from positive line conductor 2 through armature 1, contactor 14, a portion 29 of series field-magnet winding and contactor 24 to the negative line conductor 6. The effective turns of the field winding have been reduced and a third change in motor speed is accomplished.

When the master switch is in its fifth position, it again closes contactor 18 by establishing a circuit for its coil 21 which is traced from positive line conductor 9, through contact finger 11, contact segment 12, contact segment 30, contact finger 20 and coil 21, to the negative line conductor 6. Closure of contactor 18 establishes a shunt circuit for resistor 22. As previously traced, this shunt circuit now effects only a portion of the field winding 29, since contactor 24 remains closed and shunts the section 28 of the field winding 4. This circuit, as traced, effects a higher motor speed by reason of the further weakening of the motor field.

It becomes evident, upon this disclosure, that a simplified method is employed, involving but one resistor which performs a double service in shunting either all or a portion of the field-magnet windings. It is evident that the field windings may be further divided and still use but one shunt resistor to obtain a greater number of operating speeds, this resistor being manipulated in a manner similar to that previously described. An inductive or non-inductive resistor may be employed as desired.

I claim as my invention:

1. The combination with a single motor having a series field-magnet winding and means for shunting a portion of said field-magnet winding, of means comprising a single resistor for alone determining the value of the current traversing at least a portion of said field-magnet winding.

2. The combination with a single motor having a series field-magnet winding, a resistor, and means for shunting a portion of said field-magnet winding, of means for connecting said resistor in direct shunt relation to a portion of said field-magnet winding to control the value of the current traversing said portion of the field winding.

3. The combination with a motor having a series field-magnet finding, of means for procuring successively higher operating speeds, said means comprising a resistor, means for connecting said resistor in shunt relation to the field-magnet winding, means for reducing the number of effective turns of said winding and means for reducing the valve of the current traversing said turns.

4. The combination with a motor having a series field-magnet winding and a resistor, of means for connecting said resistor in shunt relation to the field-magnet winding, means for reducing the number of effective turns of said field-magnet winding, and means for reducing the value of the current traversing said effective turns.

5. The combination with a motor having a series field-magnet winding and a resistor, of means for connecting said resistor in shunt relation to the field-magnet winding, means for reducing the number of effective turns of said winding, and means comprising said resistor for reducing the value of the current traversing said effective turns.

6. The combination with a motor having a series field-magnet winding and a resistor, of means for connecting said resistor in shunt relation to the field-magnet winding, means for reducing the number of effective turns of said winding, and means comprising said resistor for shunting said reduced effective turns.

7. The method of accelerating a direct-current motor, which consists in energizing the series field-magnet winding of the motor, reducing, by a shunt circuit, the current traversing said winding, simultaneously reducing the number of effective turns of said winding and opening said shunt circuit, and then shunting the reduced field winding.

In testimony whereof, I have hereunto subscribed my name this 30th day of November, 1920.

GEORGE H. F. HOLY.